United States Patent [19]

Schlicht

[11] Patent Number: 5,967,566
[45] Date of Patent: Oct. 19, 1999

[54] LIGHT-WEIGHT, SLIP-ON PIPE FLANGE

[76] Inventor: Gunter Schlicht, 15 Briones View, Orinda, Calif. 94563

[21] Appl. No.: 09/003,070

[22] Filed: Jan. 6, 1998

[51] Int. Cl.$^6$ ........................................................ F16L 9/14
[52] U.S. Cl. .............................. 285/55; 285/405; 285/416
[58] Field of Search ................................ 285/55, 363, 405, 285/412, 413, 414, 415, 416, 53

[56] References Cited

U.S. PATENT DOCUMENTS

| | | | |
|---|---|---|---|
| 1,988,694 | 1/1935 | Mallay | 285/414 X |
| 2,956,821 | 10/1960 | Tinker | 285/416 X |
| 3,185,507 | 5/1965 | Laurizio | 285/55 X |
| 4,458,924 | 7/1984 | Schlicht . | |
| 5,413,389 | 5/1995 | Schlicht . | |

FOREIGN PATENT DOCUMENTS

| | | | |
|---|---|---|---|
| 2621806 | 12/1977 | Germany | 285/416 |
| 1425406 | 7/1988 | U.S.S.R. | 285/416 |
| 1115960 | 6/1968 | United Kingdom | 285/416 |

*Primary Examiner*—Janet M. Wilkens
*Assistant Examiner*—Karlena D. Schwing
*Attorney, Agent, or Firm*—Bielen, Peterson & Lampe

[57] ABSTRACT

Improved convoluted flanges including one embodiment having a metal inset in a polymer casing in which the inset has a convoluted configuration similar to the outer convoluted configuration of the casing and another embodiment of a convoluted, slip-on, welding flange for welding to a pipe having a cross sectional, convoluted contour that is configured using stress analysis to shift the effective loading of connecting bolts from the centerline of the bolt holes in the flange to a locus closer to the pipe to which the flange is welded.

8 Claims, 2 Drawing Sheets

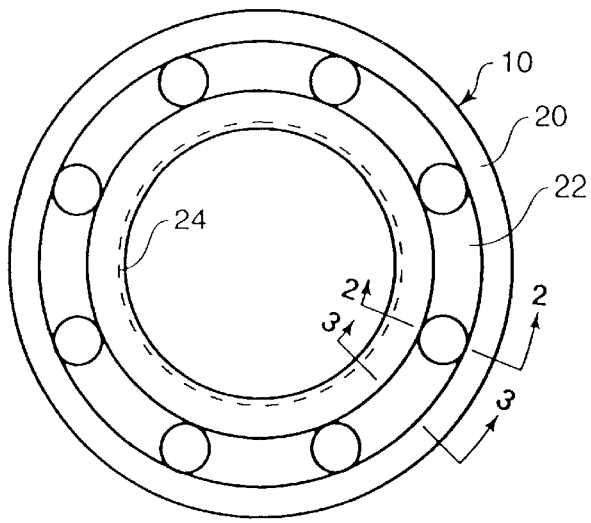
FIG. 1
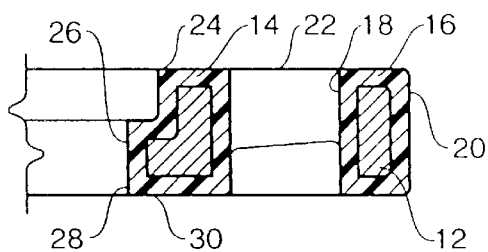 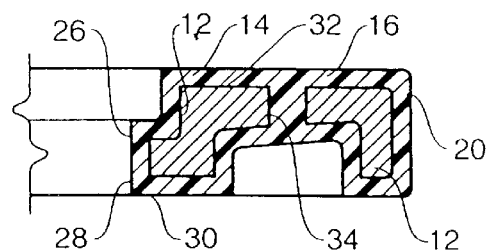
FIG. 2  FIG. 3
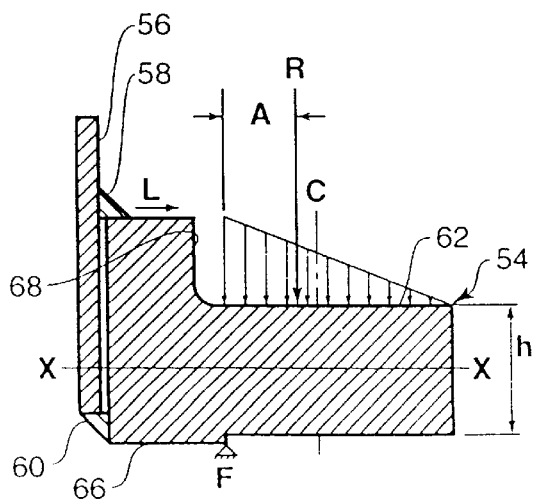 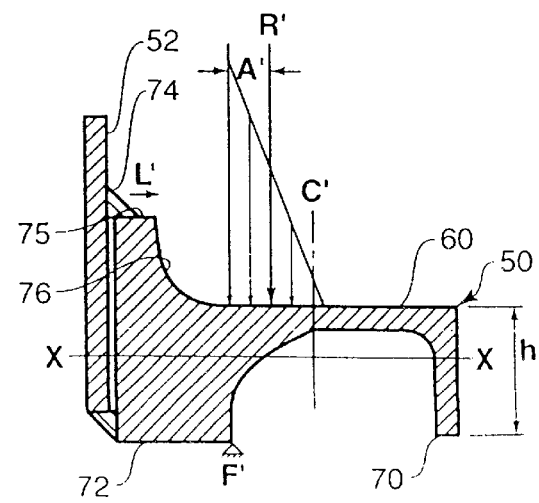
FIG. 4
(PRIOR ART)
FIG. 5

LIGHT-WEIGHT, SLIP-ON PIPE FLANGE

BACKGROUND OF THE INVENTION

This invention relates to improvements in the design of piping flanges and relates to the use of stress analysis to assist in the design of optimum configurations for a flange coupler as described in my prior patent, U.S. Pat. No. 5,413,389 issued May 9, 1995 and entitled, "Cast Convoluted Piping Flange". In the referenced patent a piping flange was described having a convoluted design with a transition in thickness from an outer rim to an inner rim of the flange. The convoluted design provided the rigidity or stiffness necessary to insure a uniform coupling face for uniform deformation of a gasket or seal, while minimizing the weight of the flange by eliminating unnecessary material.

The convoluted flanges and flange couplers of the type described in the reference patent are successful in accomplishing the objectives enumerated. Furthermore, the technique of computer aided stress analysis in the design of piping flanges has led to further improvements in the configuration of flanges that address the issue of stresses transmitted to the pipe, and in the design and construction of composite material flanges.

With regard to the latter, my prior patent, U.S. Pat. No. 4,458,924 issued Jul. 10, 1984, entitled, "Bimetal Flange Connector", describes a bimetal flange that utilizes a hub of a first metal bonded to a rim of a second metal. The concept of a composite flange of two materials and the use of a recess to reduce weight and optimize stress distribution is described in the referenced bimetal flange patent.

The subject invention includes certain of the features of the devices in the referenced patents. The advantage of computer aided stress analysis provides embodiments of piping flanges that fully consider the effect of the flange configuration in transmitting stresses to the pipe as well as efficiently distributing stresses in the flange itself.

SUMMARY OF THE INVENTION

The improved piping flanges of this invention incorporate flange configurations that optimize the stress distribution from the connecting bolts while minimizing the weight of the flange.

In one embodiment, a convoluted flange inset is encapsulated in a polypropylene casing to form a strong, yet light weight flange that is particularly suitable for corrosive environments. The polypropylene casing protects the metal inset from caustic or acidic environments and is adapted for connecting plastic or coated piping as well as conventional metal piping.

In other embodiments, the convoluted flange design is optimized for use primarily as a slip-on welding flange designed to minimize the transmission of torsional stresses at the neck of the flange to the pipe through the weld. To accomplish this design objective, the resultant locus of bolt-load, pressure distribution is shifted from the radial location of the conventional ASME flange to a concentrically inward locus on the improved flange. This shifts the moment arm to the fulcrum locus at the flange face, thereby reducing the magnitude of leveraged forces transmitted to the neck, that are ultimately transmitted to the weld joint and hence to the pipe.

Stresses in the wall of a pipe are generated by the pressure of fluid in the pipe. The bolt-load stresses transmitted to the pipe by the neck weld are cumulative to the stresses generated by the internal fluid pressures. These stresses can easily reach the failure point of the pipe if not controlled. As a design criteria, the pipe flange weldment should withstand 200% of the operational pressure yet maintain a peak stress level at 40% of the yield strength of the coupling material.

In addition to the performance criteria, the design objectives include the minimization of material in the flange, which improves ease of handling and provides savings in costs of material and shipping. It is to be understood costs of manufacture may conflict with optimum solutions for material savings resulting in the preferred embodiment for one environment to be unnecessarily costly for another environment. The result of the analytical design for the slip-on flange can be applied to other convoluted flange designs, such as a welding neck flange or any flange where it is desired or advantageous to optimize the reduction of material in the flange or to shift the load point from a locus of the centerline of bolt holes to a locus concentrically closer to the centerline of the pipe.

These other features of the invention are described in greater detail in the detailed description of the preferred embodiments.

BRIEF DESCRIPTION OF THE DRAWINGS

FIG. 1 is an underside view of a first embodiment of an improved convoluted piping flange.

FIG. 2 is a partial cross sectional view of the improved convoluted piping flange of FIG. 1 taken on the lines 2—2 in FIG. 1.

FIG. 3 is a partial cross sectional view of the improved convoluted piping flange of FIG. 1 taken on the lines 3—3 in FIG. 1

FIG. 4 is a partial cross sectional view of a conventional slip-on, welding flange.

FIG. 5 is a partial cross sectional view of an improved convoluted, slip-on welding flange shown welded to a pipe segment.

DETAILED DESCRIPTION OF THE PREFERRED EMBODIMENTS

Figure 6:
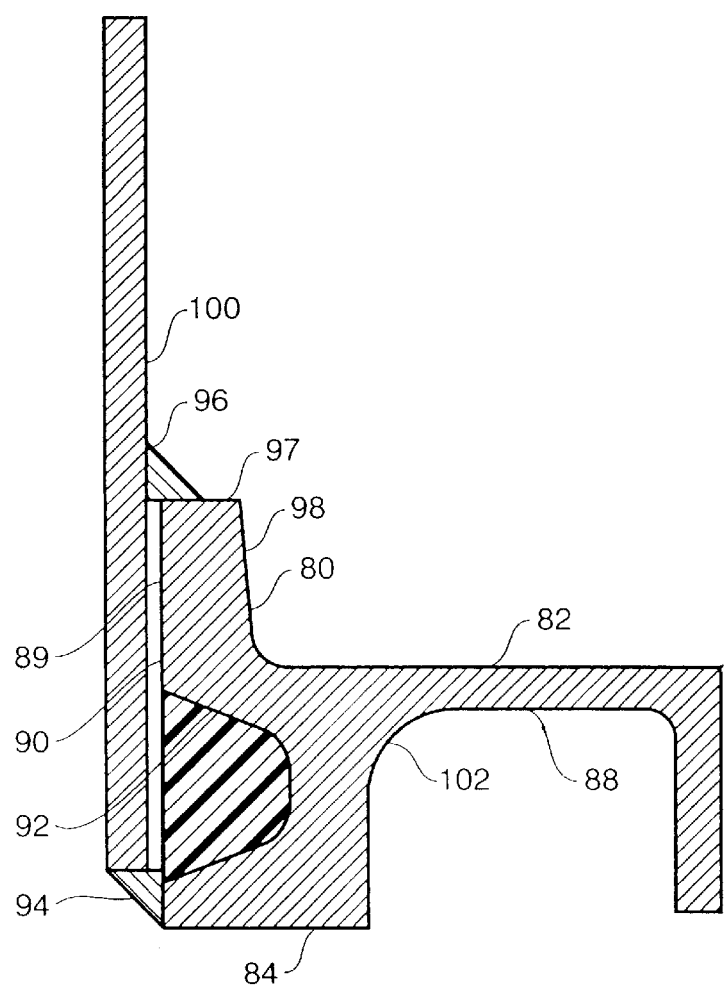
FIG. 6 is a partial cross sectional view of an alternate embodiment of the type of improved convoluted piping flange of FIG. 5.

The improved piping flanges of this invention are of two types and relate generally to the convoluted piping flanges disclosed in my referenced patents, U.S. Pat. Nos. 4,458,924 and 5,413,389. The first type comprises a convoluted flange with a ductile iron core encapsulated in a polymer casing as shown in FIGS. 1–3. The second type comprises a convoluted welding flange that is designed to optimally redistribute stresses within the flange to minimize stress on the pipe weld. Alternate configuration of the embodiment are shown in FIGS. 5–8.

Referring to FIGS. 1 to 3, a convoluted, polymer and metal piping flange is designated by the reference numeral 10. The piping flange 10 of FIG. 1 is typical of the configuration of the piping flange of this invention, which may have minor differences in configuration from size to size, and may differ in minor features, such as the number of bolting holes in the flange.

The piping flange 10 is of a type that functions with a coupling element (not shown) such as a lap at the end of the pipe forming a rim against which the flange 10 seats when coupling the flange with bolts to a similar flange on a similar pipe with an end lap.

However, the flange 10 of FIGS. 1 to 3 is a bi-material flange, similar to the bi-metallic flange of U.S. Pat. No. 4,458,924. The composite polymer and metal flange of this invention includes other types of flange couplers including those having a unitary polymer socket into which a pipe is inserted or any fitting of a flange-type, that can benefit from a high strength, light-weight metal inset. Typically the flange is constructed with 4, 8 or 12 bolt holes depending on the size and pressure rating of the flange.

The piping flange of this invention 10 has a metal inset 12 and a polymer casing 14. The metal inset 12 is preferably ductile steel formed by stamping or forging. Alternately the flange inset may be fabricated from other metal or metal alloy and may be formed by casting or other metal forming method.

Similarly, the polymer casing 14 is preferably polypropylene, but may be any polymer suitable for pipe fittings that can be molded with the inset encased within a polymer casement to provide strength and stiffness to the compound flange 10. The flange 10 has a flat bolting face 16 with a series of uniformly spaced bolt holes 18, which are used with nut, bolt and washer assemblies (not shown) when coupling the flange 10 to a similar flange or flanged pipe fitting. With reference to the underside view of FIG. 1, the flange 10 has an outer rim portion 20, a central web portion 22 of reduced thickness, and an inner hub portion 24. Both the configuration of the metal inset 12 and the composite flange 10 are convoluted and the inset tapers from the thinner outer portion 20 to the thicker inner portion 24, while the overall thickness of the casing 14 of the flange remains essentially the same. This configuration assists in directing clamping forces to an inner foot 26 which includes an inner face 28 and a projecting shoulder 30 that in part contact's a lap at the end of a lapped pipe.

An internal web portion 32 of the flange inset 12 shown in the cross sectional view of FIG. 3 has a series of flow holes 34 between the bolt holes 18 to permit the polymer to flow through the inset 12 to improve the bonding of the casing 14 to the inset when casting the flange in a mold with a liquid polymer. The entire inset is encased, having no part of the metal inset exposed resulting in a strong polymer flange that is suitable for corrosive environments. For increased sizes and or pressure ratings of the flange, dimensions and proportions of the elements may differ.

Referring now to FIGS. 5–8, embodiments of a slip-on welding flange, designated generally by the reference numeral 50, are shown in partial cross section. In FIG. 5, the welding flange 50 is shown welded to a pipe 52, which aids in providing a conceptual understanding of the dynamics of the bolt loading during use. In FIG. 4 a typical prior art ASME B16.5 flange 54 is shown with typical loading that is transmitted to the pipe 56 to which it is attached by welds 58 and 60. Both flanges 50 and 54 have a bolting face 60 and 62, respectively, with a bolt hole centerline, designated by the reference letter C and C'. It is to be understood that the flanges are similar to the flange 10 in FIG. 1, in that bolt holes are uniformly spaced around a circular locus on the flange, and may differ in number as noted.

Basic stress analysis is accomplished by treating the flange as a structural member under load. Requirements in the analysis account for the bolt holes by reduction of the modulus at the bolting area in a ratio reflecting the area cut out to the solid area. Other refinements account for the internal pressure of the pipe as applied to the asymmetric model inner wall as well as to the bottom of the flange where the gasket contact area is reduced according to ASME pressure vessel code section VIII division 1. Additionally, the bolt loading is set at two times the hydrostatic end force plus the gasket pressure as required by ASME pressure vessel code section VIII division 1.

As a safe design criterion, applicant has adopted a bolt load guide for the safety of the flange: the flange must withstand 200% of the operational pressure yet maintain a peak stress level at less than 40% of the yield strength of the material comprising the flange. Finally, the design of the flange must maintain stresses in the pipe to which it is welded below the maximum is stresses allowable under ASME.

Thus for optimum analysis of stress, various design factors must be considered including: stress rising in fillets, influence of localized bolt load on deformation of the flange, material weakening effect by the bolt hole, contact stress distribution of bolt head to flange, gasket pressure distributions at the interface of flanges, and the effect of the size of the welding connectors from the pipe to the flange.

Although a computerized analysis of internal stress under load provides refinements to the optimum design for minimizing the material content of the flange, the basic concept described with reference to FIGS. 4 and 5 achieves the goal of a reduced weight flange that both optimizes internal stress distribution in the flange to avoid excessive localized stress, and importantly, reduces the peak stresses in the pipe to which the flange is welded. In order to reduce the peak stress in the flange and in the pipe, applicant's concept is to shift the effective bolt load from close to the center of the bolt as in the conventionally designed flange 54 of FIG. 4, to a locus closer to the pipe, without shifting the location of the bolts.

With reference to FIG. 4 the flange 54 when loaded by bolts (none shown) having a centerline locus designated by the letter C distributes the load pressure radially across the bolting face 62, as shown by the sloped load diagram. The effective resultant bolt load is identified by the letter R, which is located proximate the bolt centerline locus C. The flange 54 has a gasket face 66 against which a gasket (not shown) is compressed when the flange is coupled to an opposing flange.

Since the bolting face extends beyond the outer edge of the gasket face, the bolt force acts torsionally on the gasket face 66 with the outer edge acting as a fulcrum point F. The reactant load L from the bolt load is transmitted to the weld 58 at the welding neck 68 of the flange and hence to the pipe 56 where it is cumulative to the operation pressure within the pipe. The load L is dependent on the magnitude of the bolt load R and the moment arm A.

Although idealized as a rigid structure the depicted load distribution on the bolting face 62 is relatively accurate as the radius increases with the thickness h of the flange maintained as the load diminishes to its outer edge.

In FIG. 5 however, the flange 50 has a flat bolting face 60, but a hollowed underside from the fulcrum point (fulcrum locus) F'.

An outer rim 70 maintains the outward disk appearance of the flange 50. From the centerline locus C' of bolt holes to the outer rim 70 the flange thickness is minimized to provide not only an adequate protective shell, but a deflective load surface. From the centerline locus C' to the fulcrum locus F' at the edge of the gasket face 72, the curvature defining the radial thickness is calculated to optimize bolt load pressure distribution without exceeding internal stress distribution limits according to the safely formula previously noted.

Therefore, in controlling stress distribution by a thickness gradient, a bending moment inertia is used to optimize the location of the torsional moment. The pressure distribution takes on a more extreme profile as illustrated by the load diagram in FIG. 5 with the resultant effective load located at locus R'. The locus is substantially closer to the pipe 52, reducing the moment arm A' and hence the magnitude of the resultant load L' transmitted to the pipe 52 by the upper weld 74 at the welding fillet 75 at the top edge of the welding neck 76 of the flange.

The bending moment of inertia is averaged of along the line X—X in FIG. 5, which is raised from that shown in FIG. 4. The optimum design is achieved when the torsional moment arm of the flange is reduced to an amount to satisfy the following equation:

$$\sigma = (MA'^2 h)/2I'_x$$

Where

σ is the bending stress of the flange

M is the bending moment to the flange from hydrostatic end forces and bolt load.

A' is torsional moment arm from the bolt acting loading to the gasket reacting load h is the total height of the flange.

$I'_x$ is flange bending moment of inertia.

The IPP optimum design concept requires that the designed flange with the value of $(A'^2/Ix)$ is less than the $A^2 Ix$ A is the conventional design flange bolt to gasket torsion moment arm from the bolt acting load to the gasket reacting load.

Ix is the conventional design flange bending moment of inertia that has no material cut out.

The cross sectional profile of the flange shown in FIG. 5 is effective in economically reducing the weight of the flange, while shifting the resultant bolt load to substantially reduce stress in the pipe at the critical area of the pipe weld 74. In calculating the internal stresses in a flange, it becomes apparent that material can be economically removed from such obvious areas as the welding neck 76, and the flange design of FIG. 5 reflects this reduction.

However, internal stress calculations reveal that material may be removed from other areas of the flange without compromising the structural integrity of the flange. For example, referring to FIG. 6, a flange 80 that is similar to the flange 50 of FIG. 5 has a bolting face 82, a gasket face 84 and an outer rim 86 with a recess 88 under the bolting face 82. In addition to the recess 88, the inner collet face 89 of hub 90 has an annular recess 92 between the weld 94 at the gasket face 84 and the weld 96 at the fillet 97 at the tapered welding neck 98. This recess 92 in the inner hub is concealed by the pipe 100 when the flange is welded.

In FIG. 6, the curvature 102 from the centerline locus C of the bolt holes is not as gradual as that shown in FIG. 5, which shifts the resultant load closer to the pipe 100.

Figure 7:
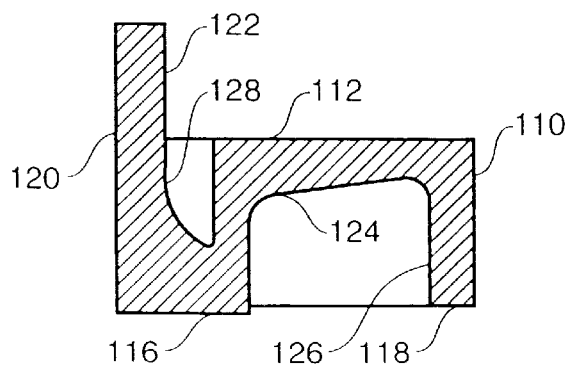
FIG. 7 is a partial cross sectional view of a further alternate embodiment of the type of improved convoluted piping flange of FIG. 4.
Figure 8:
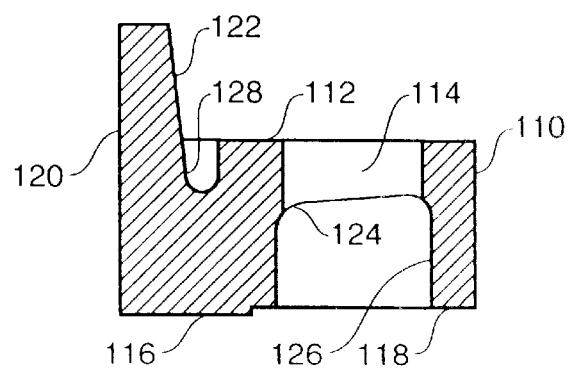
FIG. 8 is a second partial cross sectional view of the piping flange of FIG. 7.

In FIGS. 7 and 8, the partial cross sections of the welding flange 110 illustrate a flange design that maximizes the removal of material yet compensates for structural weakening at the bolt holes.

The cross sectional view of FIG. 7 illustrates the material removal midway between bolt holes and the cross sectional view of FIG. 8 illustrates the material removal at the bolt hole in the same flange. The complex configuration is designed to substantially equalize the radial bending moment inertia around the flange 110.

The flange 110 has a bolting face 112 with bolt holes 114 (one shown), a gasket face 116, an outer rim 118, and an inner hub 120 with a welding neck 122. A central web portion 124 has a hollowed recess 126 that is deeper and wider between bolt holes, as shown in FIG. 8. The thickening of the web portion 124 in the area of the bolt hole 114 compensates for the structural weakening caused by the bolt hole 114.

Similarly, stress analysis of the material of the flange under loading by the bolts reveals that stress is relatively low in the area of the hub 120 adjacent the welding neck 122 opposite the gasket face 116. A second hub recess 128 allows the flange 110 to be further lightened. Additionally, to provide a relatively uniform bending moment of inertia around the flange, the recess 128 is shallowest at each bolt hole 114 and deepest midway between adjacent bolt holes.

It is to be understood that the expense of fabricating the more complex configuration of FIGS. 7 and 8 may not be justified in the added savings in weight achieved by fully optimizing the stress distribution in the flange, while accomplishing the objective of reducing bolting forces transmitted to the pipe at the welding neck weld.

Other disadvantages that may arise from a recess in certain environments, such as the potential for corrosion from trapped rainwater can be eliminated by use of a lightweight filler, preferably a polymer, that fills one or both recesses in the optimized flanges of this invention.

Therefore, the various embodiments and configurations of the welding flanges described above are provided to illustrate different weight optimizations in weight for flanges having the primary design objective of reducing stress in the pipe weld at the welding neck.

The optimized flange designs are applicable to other convoluted flanges where reduction in material and improved distribution of stresses is required.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An improved convoluted, welding flange for welding to a pipe comprising: a circular unitary flange member of weldable material with a topside and an underside having:
   a. an inner hub portion having a welding neck with a welding fillet projecting from the topside and a flat gasket face with an outer edge on the underside;
   b. a central web portion having a series of spaced bolt holes with centerlines, with a circular locus of bolt-hole centerlines, the central web portion having an outer portion and an inner portion, and a flat bolting face on the topside and a contoured recess on the underside that economically reduces the material of the flange member; and,
   c. an outer rim portion wherein the central web portion interconnects the inner hub portion and the outer rim portion, wherein the contour of the recess between the locus of bolt-hole centerlines and the outer rim is calculated to generally minimize the bending moment of inertia in an outer part of the central web portion of the flange member, wherein the central web portion between the locus of bolt-hole centerlines and the outer rim portion has a thickness that forms a deflective load surface when the flange member is under bolt load and welded to a pipe, and wherein the contour of the recess between the locus of bolt-hole centerlines and the outer edge of the gasket face is calculated to generally optimize the bending moment of inertia and minimize the material in an inner part of the central web portion of the flange member in a manner that generally reduces stress distribution in the hub, particularly at the welding fillet when the flange member is under bolt load and welded to a pipe, wherein the contour of the recess is normal to the flat gasket face at the outer edge of the gasket face and has a curvature to the locus of bolt-hole centerlines and wherein the central web portion has a thickness that increases from the outer portion to the inner portion.

2. The improved flange of claim 1 wherein the flange member has additional recess means in the hub portion of the flange member for reducing the material of the flange.

3. The improved flange of claim 2 wherein the recess means in the hub portion of the flange member is in the topside of the flange member between the bolting face and the welding neck.

4. The improved flange of claim 2 wherein the hub has a collet face and the recess means in the hub portion of the flange member is in the collet face of the hub portion of the flange member.

5. An improved convoluted, slip-on, welding flange for welding to a pipe comprising:

a unitary circular flange member of weldable material with a topside and an underside having:
an inner hub portion having a welding neck projecting from the topside and a flat gasket face with an outer edge on the underside;
a central web portion having a series of spaced bolt holes with centerlines, with a circular locus of bolt-hole centerlines, the central web portion having an outer portion and an inner portion, a flat bolting face on the topside;
an outer rim portion wherein the central web portion interconnects the inner hub portion and the outer rim portion; and,
recess means in the underside of the flange member between the outer edge of the gasket face in the hub portion and the outer rim portion for shifting a resultant locus of bolt-load pressure distribution from a radial location proximate the circular locus of bolt-hole centerlines to a concentrically inward location on the improved convoluted flange, for minimizing the material in the flange member, and for minimizing the torsional stresses at the welding neck of the flange member that are transmittable to a pipe when the flange member is welded to the pipe and under bolt load, wherein the central web portion has an outer part between the circular locus of bolt-hole centerlines and the outer rim portion having a thickness that forms a deflective load surface and wherein the central web portion has an inner part between the circular locus of bolt-hole centerlines and the outer edge of the gasket face wherein the recess means has a contour with a curvature that begins normal to the gasket face and wherein the web portion has a thickness that increases from the outer part to the inner part.

6. The improved flange of claim 5 wherein the recess means is uniform around the flange member.

7. The improved flange of claim 5 wherein the recess means comprises an annular recess that is deeper and wider between bolt holes wherein the radial bending moment of inertia is substantially uniform around the flange member.

8. The improved flange of claim 5 wherein the flange member includes additional recess means in the hub portion of the flange member for reducing the material of the flange.

* * * * *